United States Patent [19]

Roloff

[11] 4,291,808
[45] Sep. 29, 1981

[54] ROLLER CONVEYOR-CLASSIFIER

[75] Inventor: Carl A. Roloff, West Bend, Wis.

[73] Assignee: Allis-Chalmers Corporation, Milwaukee, Wis.

[21] Appl. No.: 215,853

[22] Filed: Dec. 12, 1980

Related U.S. Application Data

[63] Continuation of Ser. No. 79,264, Sep. 27, 1979, abandoned.

[51] Int. Cl.³ .............................................. B07B 13/05
[52] U.S. Cl. .................................... 209/668; 209/673; 308/20
[58] Field of Search ............... 209/668, 669, 670, 671, 209/672, 673, 676, 667; 198/780; 193/35 R, 37; 308/20, 15; 226/194

[56] References Cited

U.S. PATENT DOCUMENTS

| | | | |
|---|---|---|---|
| 2,370,539 | 2/1945 | Hodecker | 209/668 |
| 2,743,813 | 5/1956 | Erickson | 209/668 |
| 2,830,703 | 4/1958 | Laase | 209/668 |

*Primary Examiner*—Allen N. Knowles
*Attorney, Agent, or Firm*—Arthur M. Streich

[57] ABSTRACT

A roller conveyor or conveyor-classifier assembly is disclosed which comprises a plurality of rollers (16), a corresponding bearing support block (18) for each end of each of the rollers (16), with each block (18) being of upper case "H" configuration in transverse cross section to define an upper and lower groove (18U and 18L in FIG. 6), and including frame (25) for supporting the blocks (18). The frame assembly (25) comprises oppositely disposed rails (22A, 24A) each having a track (22B, 24B), respectively, adapted to slidably project into oppositely disposed grooves (18U, 18L) in bearing support blocks (18). Shims (36) which are lower "h" configuration in transverse cross section, are insertable from the outboard sides of the frame assemblies (25) and are interposed between adjacent bearing support blocks (18) with the lower portion (36A, 36B) of the "h" configuration being adapted to interlockingly straddle the upwardly projecting lower track (24B) for retention in position to provide a predetermined spacing between the adjacent bearing support blocks (18), and thus, to provide a predetermined clearance or spacing between adjacent rollers (16) supported by the adjacent bearing support blocks (18).

1 Claim, 11 Drawing Figures

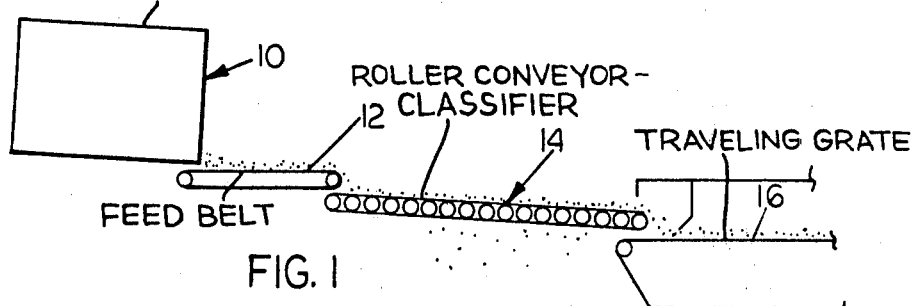
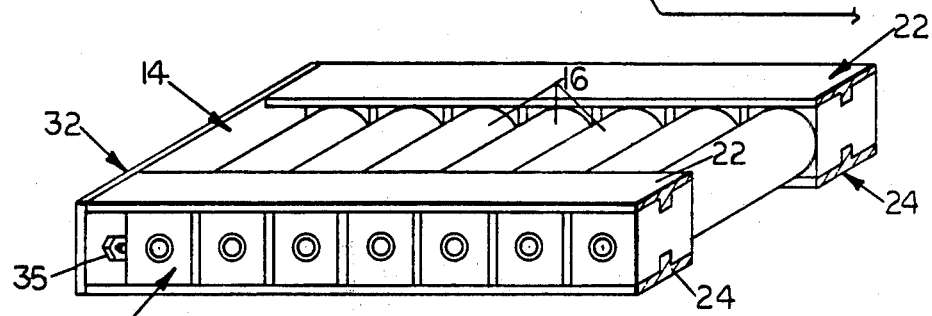
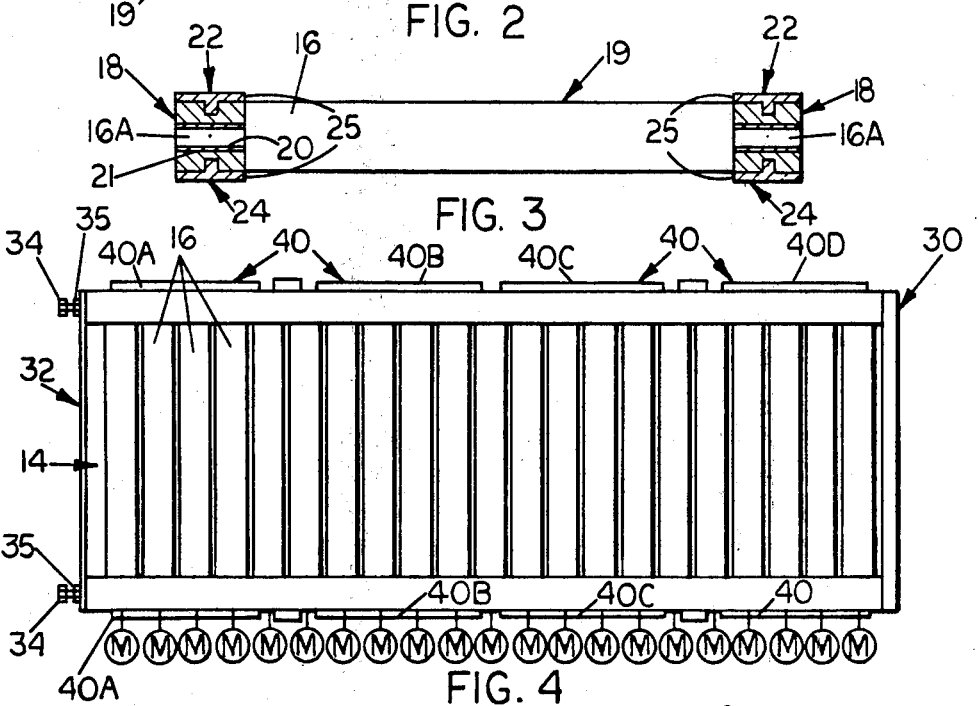
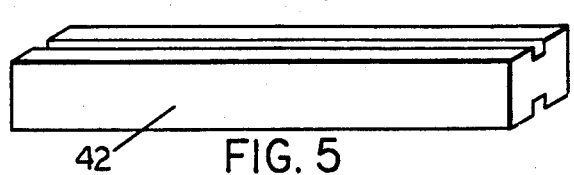
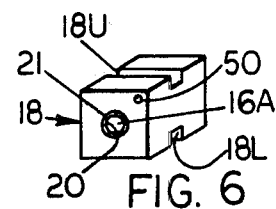

ROLLER CONVEYOR-CLASSIFIER

TECHNICAL FIELD

This is a Continuation of application, Ser. No. 079,264, filed Sept. 27, 1969, now abandoned.

This invention relates to roller conveyors or roller conveyor-classifiers for conveying and/or classifying objects or materials.

The roller conveyor-classifier of the invention is particularly suited for, although not restricted to, use in connection with the conveying and classifying of "green" mineral ore pellets from a supply source such as a balling drum which discharges the green ore pellets onto a conveyor-classifier for transport to the inlet end of a grate conveyor. However, the principles of the present invention can also be applied to a roller conveyor and method of making same where the conveyor does not include a material classifying function.

STATEMENT OF THE INVENTION

Accordingly, it is an object of the present invention to provide an improved roller conveyor or roller conveyor-classifier construction which minimizes the number and complexity of parts required with resulting simplification of assembly and manufacturing procedures, and with consequent economic savings as compared to prior art constructions for this general type of apparatus.

It is a further object of the invention to provide a new and improved roller conveyor or roller conveyor-classifier construction and method of manufacturing same in which the resulting assembly is characterized by overall structural rigidity and by ease of adjustment both at the time of initial manufacture and also for subsequent maintenance adjustment.

It is another object of the invention to provide an improved roller conveyor or roller conveyor-classifier construction and method of manufacturing same, including an improved shimming arrangement which facilitates ease of adjustment of the spacing between contiguous rollers as may be required, for example, for a predetermined desired material classification, and in which the improved shimming arrangement also permits adjustment of the roller spacing subsequent to the initial manufacturing assembly whereby to compensate for wear on the rollers or for other reasons and without requiring disassembly of the entire roller conveyor or conveyor-classifier to permit insertion of the shim members.

In achievement of these objectives, there is provided in accordance with the invention, a roller conveyor or conveyor-classifier assembly comprising a plurality of rollers, a corresponding bearing support block for each end of each of said rollers, a bearing supported by each of said bearing support blocks, each roller being rotatably supported contiguous its opposite ends by the bearings of its corresponding oppositely disposed bearing support blocks, each roller and its corresponding bearing support blocks defining a first subassembly, whereby said roller conveyor assembly comprises a plurality of said first subassemblies, a support frame for said plurality of first subassemblies and comprising first and second oppositely disposed frame means respectively adapted to slidably receive and retain the respective oppositely disposed bearing support blocks, and means mounted on said roller conveyor assembly for applying a compressive loading to the plurality of bearing support blocks on each lateral side of said roller conveyor assembly.

Further objects and advantages of the invention will become apparent from the following description taken in conjunction with the accompanying drawings in which:

BRIEF DESCRIPTION OF THE DRAWINGS

FIG. 1 is a diagrammatic view of a portion of a mineral ore pelletizing apparatus and process in which the roller conveyor-classifier of the invention has particular utility;

FIG. 2 is a perspective view of a roller conveyor-classifier in accordance with the invention;

FIG. 3 is a view in transverse cross section of the roller conveyor-classifier taken along line III—III of FIG. 7;

FIG. 4 is a top plan view of the roller conveyor-classifier of FIGS. 1 and 2;

FIG. 5 is a perspective view of a bar member which may be cut to form a plurality of the bearing support blocks of FIG. 6;

FIG. 6 is a perspective view of a bearing support block in accordance with the invention used at one end of one of the rollers of the roller conveyor-classifier of FIGS. 1-4, inclusive;

DESCRIPTION OF THE AGGLOMERATING PREFERRED EMBODIMENT

Figure 7:
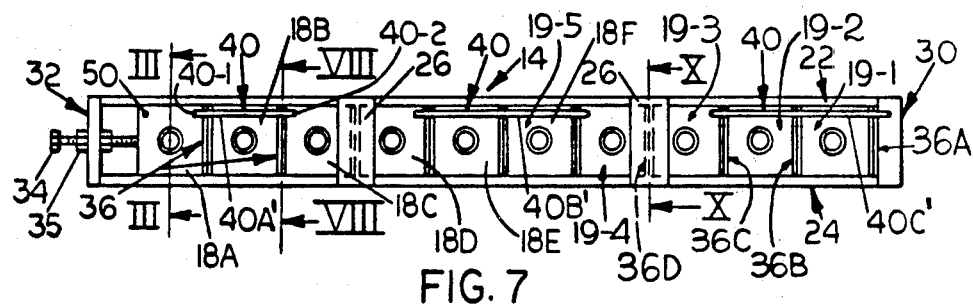
FIG. 7 is a side elevation view of a roller conveyor-classifier similar in construction to the roller conveyor-classifier of FIG. 4 but having fewer roller and bearing block subassemblies 19 than the embodiment of FIG. 4.

Referring to FIG. 1, there is schematically shown a system in which the roller conveyor-classifier of the invention has particular utility. Thus, there is shown in FIG. 1 an agglomerating device generally indicated at 10 in which mineral ore in moistened pulverized form is formed into balls or pellets which are then discharged onto a feed belt 12. The agglomerating device may be a balling drum or a balling disc, for example. Feed belt 12 delivers the balls or pellets of ore onto the inlet end of a roller conveyor-classifier generally indicated at 14 which may be constructed in accordance with the present invention, and the roller conveyor-classifier 14 discharges the "green" ore pellets having a diameter above a predetermined minimum diameter onto the inlet end of a traveling grate 16. Traveling grate 16 carries the ore pellets through various stages of a thermal treatment process and may discharge the thermally treated pellets into the inlet end of a rotary kiln (not shown). The roller conveyor-classifier 14, in addition to serving as a conveyor for delivering the green ore pellets to the inlet end of traveling grate 16, also provides a classifying function, since the spacing between contiguous rollers of roller conveyor-classifier 14 can be adjusted to be of such value as to permit undersize ore pellets below a predetermined size or diameter to drop downwardly through the spacing between contiguous rollers and to be returned to the balling drum for recycling. This invention is directed to an improved construction for the roller conveyor-classifier 14 of FIG. 1, and to a method of manufacturing such an improved roller conveyor-classifier.

Referring now to FIGS. 2, 3 and 4, the roller conveyor-classifier generally indicated at 14 includes a plurality of roller members 16. When roller conveyor-classifier 14 is employed in a system such as that shown diagrammatically in FIG. 1, each of the roller members 16 is driven by its own individual drive motor M (FIG. 4) through a suitable coupling to the drive motor. The plurality of motors M may instead be driven by a common drive motor or the like which is suitably connected to all of the rollers 16.

As best seen in the view of FIG. 3, each of the roller members 16 is provided at each of its opposite ends with a reduced end portion 16A which is supported in a corresponding bearing support block generally indicated at 18.

Each of the bearing support blocks 18 is of generally H-shape in transverse cross section and includes an upper notch 18-U and a lower notch 18-L. Each bearing support block 18 is provided with a passage 20 therethrough which receives a suitable bearing 21 such as a sleeve bearing or anti-friction bearing, and the reduced end portion 16A at each end of a given roller 16 is received in and rotably supported by a corresponding bearing 21. Except for upper and lower notches 18-U and 18-L, bearing support block 18 is otherwise a six-sided polyhedron having planar surfaces on all of its sides. A separate bearing support block 18 as just described is provided for each of the opposite reduced ends 16A of each roller 16. Each roller 16 and the oppositely disposed bearing blocks 18 supporting the given roller 16 together define a roller and bearing block subassembly generally indicated at 19, as seen in FIG. 3.

As seen in the views of FIGS. 2, 3 and 7–11, inclusive, an upper support rail 22 and a lower support rail 24 are provided on each side of the roller conveyor-classifier assembly to support the plurality of roller and bearing block subassemblies 19. Upper support rail 22 and lower support rail 24 define a frame subassembly 25 on each lateral side of roller conveyor assembly 14. Each of the upper rail members 22 is of T-shape cross section and includes a web portion 22A and a leg portion 22B which extends downwardly from a substantially centrally located part of web portion 22A. Leg portion 22B is adapted to be received in the corresponding notch 18-U of each of the plurality of bearing support blocks 18 on the corresponding side of the roller conveyor-classifier assembly. Similarly, the lower support rail member generally indicated at 24 on each side of the assembly includes a laterally extending web portion 24A and a leg portion 24B which extends upwardly from a substantially centrally located part of lower web portion 24A. Leg portion 24B is received in the corresponding lower notch 18-L of each of the plurality of bearing support blocks 18 on the corresponding side of the roller conveyor-classifier assembly.

Figure 10:
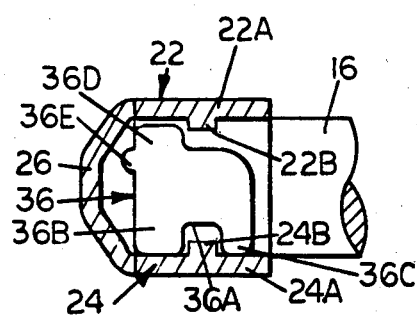
FIG. 10 is a view in transverse section taken along line X—X of FIG. 7.

As best seen in the views of FIGS. 7 and 10, upper and lower support rails 22 and 24 on each side of the assembly are structurally reinforced and interconnected by one or more stiffening webs 26 which is/are welded to the outboard edges of the respective upper and lower rails 22 and 24 on a given side of the roller conveyor-classifier assembly. Several of these reinforcing web portions 26 may be connected between upper and lower support rails 22 and 24 at longitudinally spaced intervals on each side of roller conveyor-classifier assembly 14. As best seen in the view of FIG. 10, each of the reinforcing webs 26 is bowed outwardly so as not to interfere in any way with the positioning of bearing blocks 18 between the support rails 22 and 24 on a given side of the roller conveyor-classifier assembly, and to provide access for bearing lubrication and maintenance.

At one longitudinal end of the roller conveyor-classifier assembly, such as the right-hand end relative to the views of FIGS. 4 and 7, for example, the two laterally spaced support rail subassemblies are rigidly joined together by a cross member or plate generally indicated at 30 which is welded at each of its respective laterally opposite ends to the upper and lower rails 22 and 24 on each side of the roller conveyor-classifier assembly. At the opposite end of the assembly (or left-hand end relative to the views in FIGS. 2, 4 and 7), a second end plate or cross member 32 is detachably secured to the oppositely disposed laterally spaced support rail subassemblies. A pair of laterally spaced bolt members 34 (FIGS. 4 and 7) are positioned in screw threaded engagement with detachable end plate 32. A lock nut 35 on each bolt 34 maintains the respective bolt in a desired adjusted position. Bolt members 34 define a loading means for placing the stacked bearing support blocks 18 and interposed shims 36 in longitudinal compression. Each of the bolt members 34 is positioned in alignment with a corresponding one of the rows of stacked bearing support blocks 18. Each bolt 34 can be rotated to apply compressive force to the plurality of bearing support blocks 18 with which it is in alignment.

While bolts 34 have been shown as an exemplary arrangement for applying a compressive load to the bearing support blocks 18 and shims 36, other means may be provided for placing shims 36 and bearing support blocks in compression. For example, an overcenter clamp (not shown) may be suitably mounted to apply compressive loading to the bearing support blocks 18 and shims 36. Alternatively, a spring loaded compression preload assembly (not shown) may be suitably mounted to apply compressive loading to the bearing support blocks 18 and shims 36.

In a still further modified arrangement for applying a compressive force to the bearing support blocks and shims, a single bolt 34 could be used, such bolt being positioned centrally of the transverse dimension of detachable end plate 32. Such a centrally located bolt 34 would apply pressure against a plate member (not shown) interposed between the inner surface of end plate 32 and the contiguous surface of the nearest bearing support blocks 18 on both lateral sides of the roller conveyor-classifier assembly, whereby pressure applied by the single centrally located bolt 34 would be transmitted through the interposed plate member to the horizontally stacked bearing blocks and shims on both lateral sides of the assembly.

An important feature of the construction is the use of shims 36 which are interposed between contiguous bearing support blocks 18 to provide a predetermined desired spacing between contiguous rollers 16.

Figure 8:
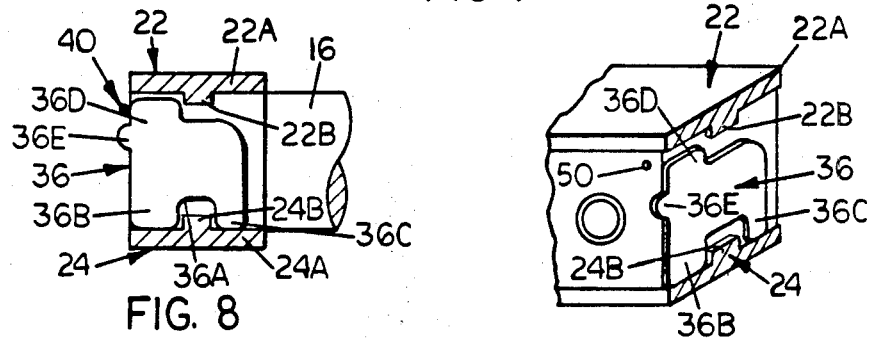
FIG. 8 is a fragmentary view in transverse cross section taken along line VIII—VIII of FIG. 7 showing one of the adjusting shims used to obtain proper spacing of the rollers of the roller conveyor-classifier.
Figure 9:
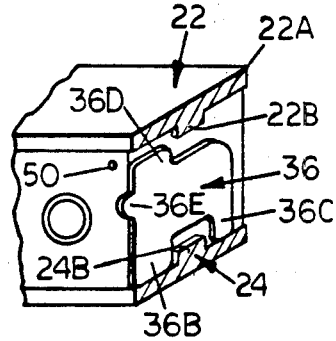
FIG. 9 is a view generally similar to FIG. 8, with the parts being shown in perspective.

As seen in FIGS. 8, 9 and 10 shim or spacer 36 is in the shape of a "lower case" h, in contrast to the bearing support blocks 18 which have a cross section in the shape of a capital or upper case H. Shim 36 includes a notch or slot portion 36A which extends upwardly from the bottom edge of the shim. Slot 36A defines two downwardly extending leg portions 36B and 36C. At the upper portion thereof, relative to the views in the drawings, spacer 36 includes a single upwardly extending leg portion 36D on the left-hand or outboard side of the spacer relative to the views in the drawings and also relative to the roller conveyor-classifier assembly.

Each shim 36 is provided with an extension 36E which is used as a means for gripping shims 36 during insertion and removal thereof from the roller conveyor-classifier assembly. The shape of shim or spacer 36 as seen in FIGS. 8-10, inclusive, has important advantages since it permits shims 36 to be inserted into the interspace between contiguous bearing support blocks 18 from the outboard side of the assembly by a rotating motion, with spacer 36 being tipped into engagement with the upstanding edge 24B of lower support rail member 24 on the corresponding side of roller conveyor-classifier assembly 14. The shape of shims 36 permits shims 36 to be inserted by the tipping motion previously described either at the time of initial manufacture, or as required at any time subsequent to the initial manufacture of the roller conveyor-classifier assembly to take up or compensate for wear on rollers 16, and without the necessity of disassembling the entire roller conveyor-classifier assembly in order to permit insertion of the shims or spacers.

Referring now to FIG. 5, there is shown an elongated bar 42 which may be an extrusion, a rolled shape or the like, having an H cross section similar to the cross section of bearing support 18 shown in the view of FIG. 6. This elongated bar may then be cut into a plurality of sections, each of which sections then forms one of the bearing supports 18 of FIG. 6.

METHOD OF ASSEMBLY

In assembling the roller conveyor or roller conveyor-classifier 14, the assembly process is begun using a support frame comprising two laterally spaced pairs of upper and lower support rails 22 and 24 which are closed at one end only by a cross plate 30 (FIGS. 4 and 7) which is welded or otherwise suitably secured to upper and lower support rails 22 and 24 on each side of the framework. At this stage of the assembly, the opposite end of the supporting framework is open and the detachable cross member 32 has not yet been positioned on the supporting framework. A plurality of the roller and bearing block subassemblies 19 each comprising a roller 16 and a pair of oppositely disposed bearing blocks 18 and bearings 21 supporting the opposite reduced end portions 16A of a given roller 16, are then inserted into the guide tracks defined by upper and lower support rails 22 and 24 on the two laterally opposite sides of the framework.

In the initial assembly of the plurality of roller and bearing block subassemblies 19 into the supporting framework, the contiguous rollers 16 are first placed in face-to-face abutting contact. With the rollers in abutting contact as just mentioned, the gap between adjacent bearing support blocks 18 is then measured.

Starting at the end of the roller conveyor-classifier assembly 14 adjacent cross member 30, the proper alignment for the first roller and bearing block subassembly 19-1 (FIG. 7) is established by inserting shims 36-A (FIG. 7) between cross member 30 and the oppositely disposed bearing support blocks 18 of said roller and bearing block subassembly 19-1. "Proper alignment" is defined as the proper positioning of the axis of the roller of subassembly 19-1 in a direction normal (i.e., at 90°) to the longitudinal axis of the roller conveyor assembly 14 and hence normal to the laterally spaced longitudinal frame subassemblies 25.

In order to provide the clearance space between cross member 30 and the subassembly 19-1, a pair of wedges (not shown) are driven between cross member 30 and the contiguous roller 16-1. With the clearance space thus established between cross member 30 and roller 16-1 of subassembly 19-1, shims 36A are then tipped into position between cross member 30 and each of the respective oppositely disposed bearing support blocks of subassembly 19-1. Shims 36 are tipped into position from the outboard side of each of the oppositely disposed frame subassemblies 25, in the manner previously described. Any lack of perpendicularity or normality between cross member 30 and the longitudinal axis of roller conveyor-classifier assembly 14 may be compensated for by adding more shims 36 on one lateral side of assembly 14 than the other, to thereby insure a proper normal relation of the first roller and bearing block subassembly 19-1 relative to the longitudinal axis of assembly 14.

With proper alignment (i.e., proper normality) of the first roller and bearing block subassembly 19-1 insured, proper alignment (normality) of all of the other similar subassemblies 19-2, 19-3, etc., will then be insured.

In order to provide the desired clearance between the various subassemblies 19-1, 19-2, 19-3, etc. (FIG. 7), as required for material classification or for other reasons, the pair of wedges are driven between the contiguous rollers 16 of successive pairs of subassemblies 19-1, 19-2, etc. to provide the necessary clearance for shim insertion. Shims 36 (FIGS. 8-10, inclusive) having a total thickness equal to the gap established between adjacent bearing support blocks 18 with rollers 16 in abutting face-to-face contact as previously described, plus shims equal in thickness to the required roller clearance between adjacent rollers 16 as determined by the requirements of the particular process with which the equipment is being used, such as that described in connection with FIG. 1, are then inserted into the space between each pair of contiguous bearing blocks 18 on each of the opposite sides of assembly 14.

Shims 36 for proper clearance between adjacent rollers 16, are inserted between the corresponding bearing support blocks 18 on each lateral side of the roller conveyor assembly 14 by tipping the shims 36 inwardly from the outboard side of the respective lateral sides of the assembly, as previously described. This eliminates the requirement for removing the roller and bearing support block subassemblies 19 from supporting framework 25 for shim insertion with subsequent reassembly into framework 25.

After the required thickness of shims is inserted between each pair of contiguous bearing support blocks 18, the wedges are then removed from between the corresponding rollers 16.

With all of the roller and bearing block subassemblies 19 in position in the supporting framework and with the required thickness of shims being interposed between each pair of contiguous bearing blocks 18 on each lateral side of the assembly, the detachable end plate 32 is then suitably detachably secured to the upper and lower support rails 22 and 24 at the heretofore open end of the assembly to connect the two laterally spaced frame subassemblies 25 at the heretofore open end of assembly 14, and each of the loading bolts 34 is then turned to apply a predetermined pressure against the horizontally stacked bearing blocks 18 and shims 36 on each of the respective lateral sides of the assembly. When loading bolts 34 are adjusted to the desired position, lock nuts 35 are tightened to hold bolts 34 in the desired adjusted position. Alternatively, if only a single loading bolt 34 is used and which is located centrally of the transverse dimension of end cross member 32, the centrally located bolt 34 may be tightened in the same manner as just described to apply pressure against an interposed pressure transmittal plate (not shown) which in turn applies equal pressure against the two laterally spaced horizontally stacked rows of bearing support blocks 18 and interposed shims 36 on each lateral side of the roller conveyor-classifier assembly 14.

A final check on clearance between rollers 16 is made with suitable correction by shim insertion before final tightening of loading bolt or bolts 34.

The loading bolts or bolt 34 when tightened cause the horizontal stacks of bearing support blocks 18 and interposed shims 36 to be loaded in horizontal compression, and cause the roller conveyor assembly 14 to become a rigid beam.

If it is necessary to insert any shims 36 in the roller conveyor-classifier assembly 14 after the initial manufacturing operation, in order to compensate for wear on rollers 16 or for any other reason, shims 36 may be inserted into the roller conveyor assembly on the outboard side of each upper and lower rail subassembly 25 in the same manner as in the initial assembly procedure merely by tipping the shims 36 to be inserted in a clockwise direction relative to the views of FIGS. 2, 8, 9 and 10 from the outboard side of the rail subassembly on a given side of the roller conveyor assembly whereby to engage notch 36A in the lower end of the adjusting shims 36 being inserted, with the upstanding vertical leg 24B of lower rail 24 on the given lateral side of the roller conveyor assembly.

In order to prevent any of the shims 36 from falling out of the assembly by tipping in a counterclockwise direction relative to the views in the drawings toward the outboard side of the respective upper and lower rail subassemblies 25, a plurality of shim retaining links generally indicated at 40, and specifically designated at 40A', 40B' and 40C' in FIG. 7, are inserted into engagement with retaining holes 50 (FIGS. 6 and 9) in the outboard faces of spaced bearing blocks 18 whereby to prevent shims 36 from falling out of the assembly. As seen in FIGS. 2 and 6, each of the bearing blocks 18 is provided in the outboard surface thereof with one or more holes or recesses 50 which are respectively adapted to receive one of the opposite ends 40-1 or 40-2 of a given shim retaining link 40. Shim retaining link 40 has two opposite end portions 40-1 and 40-2 each of which is adapted to engage a corresponding hole or recess 50 in the outboard surface of one of a pair of spaced bearing blocks such as those indicated at 18A and 18C in the view of FIG. 7. Thus, as seen in FIG. 7, the shim retaining link 40A' which extends in spanning relation to bearing blocks 18A, 18B and 18C has the opposite inturned ends 40-1 and 40-2 thereof engaging holes 50 in the outboard surfaces of bearing blocks 18A and 18C. It can be seen that shim retaining link 40A' will retain the shims 36 between bearing support blocks 18A and 18B and also between bearing support blocks 18B and 18C to effectively prevent shims 36 from falling out of the assembly. In a similar manner, as seen in FIGS. 4 and 7, additional shim retaining links 40B' and 40C' are used to retain the shims between other bearing support blocks on the same lateral side of the roller conveyor assembly as seen in the drawings. Similar shim retaining links 40 are also used on the opposite lateral side of the roller conveyor assembly.

Figure 11:
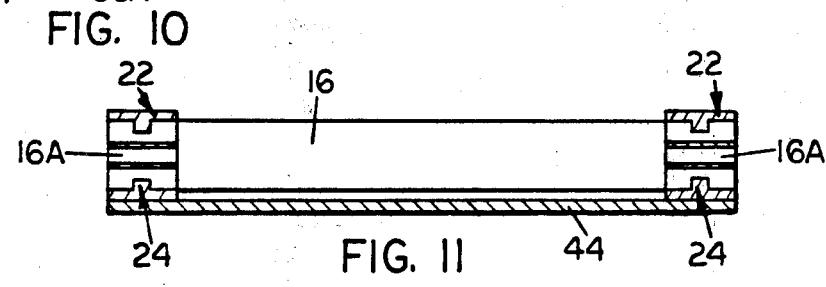
FIG. 11 is a view in transverse section of a modified arrangement showing the use of a reinforcing member extending laterally between the two opposite sides of the conveyor framework on the under surface of the framework.

In a further structural modification shown in FIG. 11, one or more cross members 44 may extend between the oppositely disposed lower rails 24 to further structurally reinforce the assembly 14, in addition to the fixed cross member 30 at one end of the assembly and also in addition to the detachable cross member 32 at the opposite end of the assembly.

In any of the various arrangements disclosed for applying compressive loading to the horizontally stacked bearing support blocks 18 and interposed shims 36, such as the loading bolts or bolt 34, or the overcenter clamp (not shown), or the spring loaded compression preload assembly (not shown), it will be understood that the compression loading is continuously applied during the normal usage of conveyor-classifier assembly 14 to maintain assembly 14 in properly assembled relation.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A roller conveyor or conveyor-classifier assembly comprising:
   (a) a plurality of first subassemblies each comprising a roller (16), a bearing support block (18) for each end of each roller, a bearing (21) supported by each of said bearing support blocks (18), each roller (16), being rotatably supported contiguous its opposite ends by the bearings of its corresponding oppositely disposed bearing support blocks;
   (b) a support frame (25) for said plurality of first assemblies, said support frame comprising an upper and lower rail member (22A, 24A) each defining a track (22B, 24B) projecting therefrom upwardly and downwardly, respectively, toward each other and in spaced relation from each other in a common plane perpendicular to the rail members (22A, 24A);
   (c) each of said support blocks (18) being of upper case "H" configuration in transverse cross section to define an upper and lower groove (18U, 18L) having walls engaging with said upwardly and downwardly projecting tracks (22B, 24B) when said support blocks (18) are inserted between said upper and lower rail members (22A, 24A);
   (d) shim means (36) between adjacent support blocks (18), said shim means being of substantially lower case "h" configuration in transverse cross section with the lower portion (36A, 36B) of said "h" configuration being adapted to interlockingly straddle the upwardly projecting track (24B) of the lower of said rails (24A) upon rotating a lower and forward leg portion (36C) of said "h" configuration inwardly of support frame parameter and over said lower track (24B) and into engagement with said lower rail (24A), whereby said shim means (36) may be inserted into and removed from shimming relation between contiguous bearing support blocks (18) when said roller conveyor assembly is in assembled condition.

* * * * *